United States Patent [19]

Noah et al.

[11] Patent Number: 5,496,155
[45] Date of Patent: Mar. 5, 1996

[54] ROTARY DEVICE HAVING PLURAL MOUNTING ORIENTATIONS AND FLUID CONNECTIONS

[75] Inventors: Bruce C. Noah, West Lafayette; Robert S. Phillips; Frederick D. Venable, both of Lafayette, all of Ind.

[73] Assignee: TRW Inc., Lyndhurst, Ohio

[21] Appl. No.: 201,616

[22] Filed: Feb. 24, 1994

[51] Int. Cl.$^6$ .............................. F04B 49/02; F01C 1/344; F01C 13/00; F01C 19/00
[52] U.S. Cl. ........................... 417/310; 418/39; 418/104; 418/133
[58] Field of Search ............................. 417/310; 418/15, 418/39, 102, 104, 133

[56] References Cited

U.S. PATENT DOCUMENTS

| 2,336,475 | 12/1943 | Fulcher | 418/39 |
|---|---|---|---|
| 2,461,624 | 2/1949 | Bakewell | 418/39 |
| 3,012,511 | 12/1961 | Adams | 418/39 |
| 5,180,297 | 1/1993 | Hansen et al. | 418/102 |
| 5,226,802 | 7/1993 | Nakamura et al. | 417/310 |

FOREIGN PATENT DOCUMENTS

| 158477 | 4/1957 | Sweden | 417/310 |
|---|---|---|---|
| 207743 | 12/1967 | U.S.S.R. | 418/133 |

Primary Examiner—John J. Vrablik
Attorney, Agent, or Firm—Tarolli, Sundheim & Covell

[57] ABSTRACT

An improved rotary device (20), such as a fluid pump or motor, includes a housing (24) which encloses a working unit (22). The working unit (22) includes a cam ring (38) which cooperates with a rotor (40) and a plurality of vanes (42) to form a plurality of variable volume working chambers. The housing (24) includes a main section (26) and a cover section (28). The main section (26) of the housing (24) has three separate risers (122, 124 and 126). Any one of the three risers (122, 124 or 126) may be connected with a fluid conduit (116). The main and cover sections (26 and 28) of the housing (24) are movable relative to each other to enable the rotary device (20) to be mounted in a selected one of a plurality of orientations on a support structure.

16 Claims, 9 Drawing Sheets

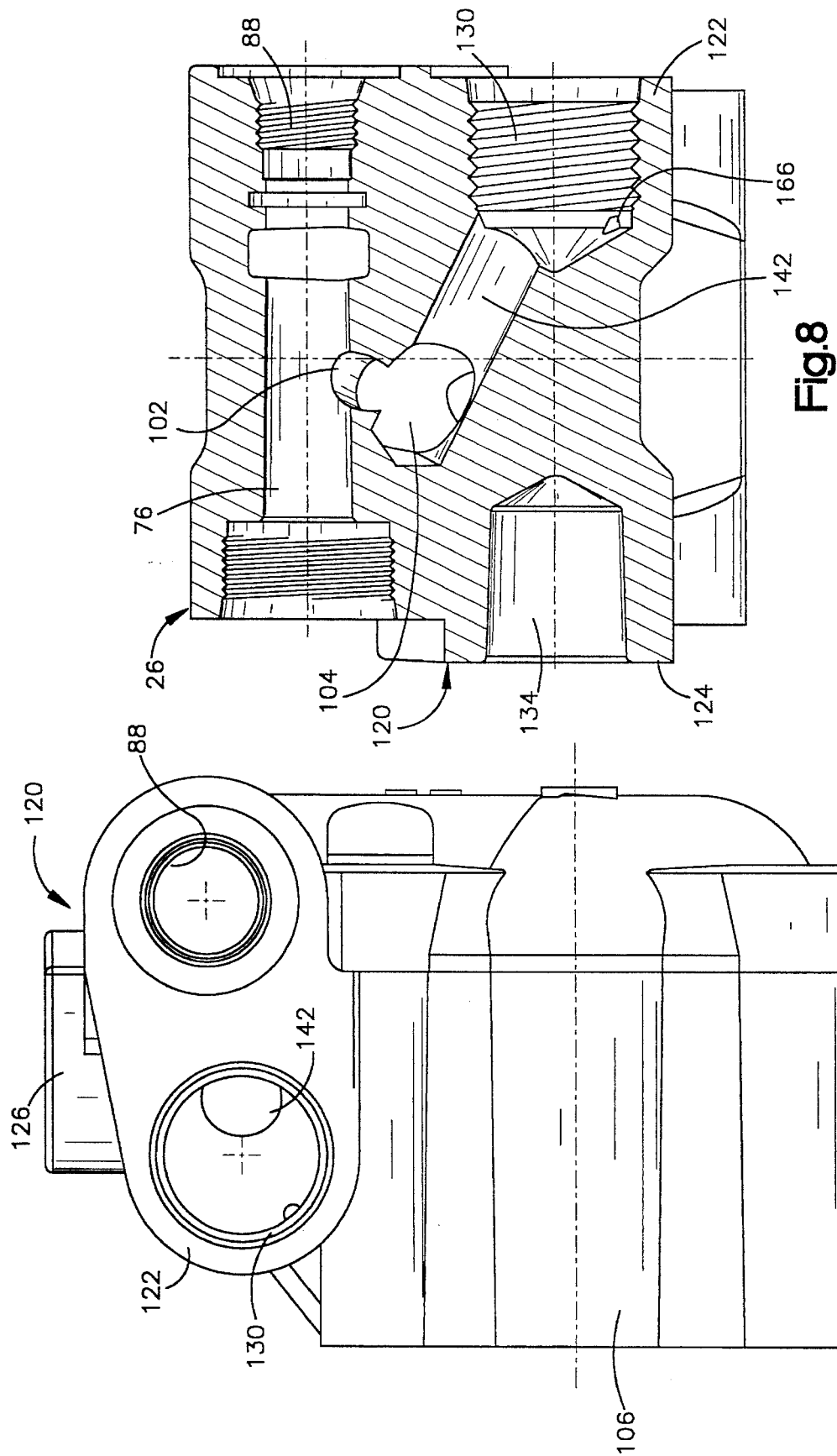

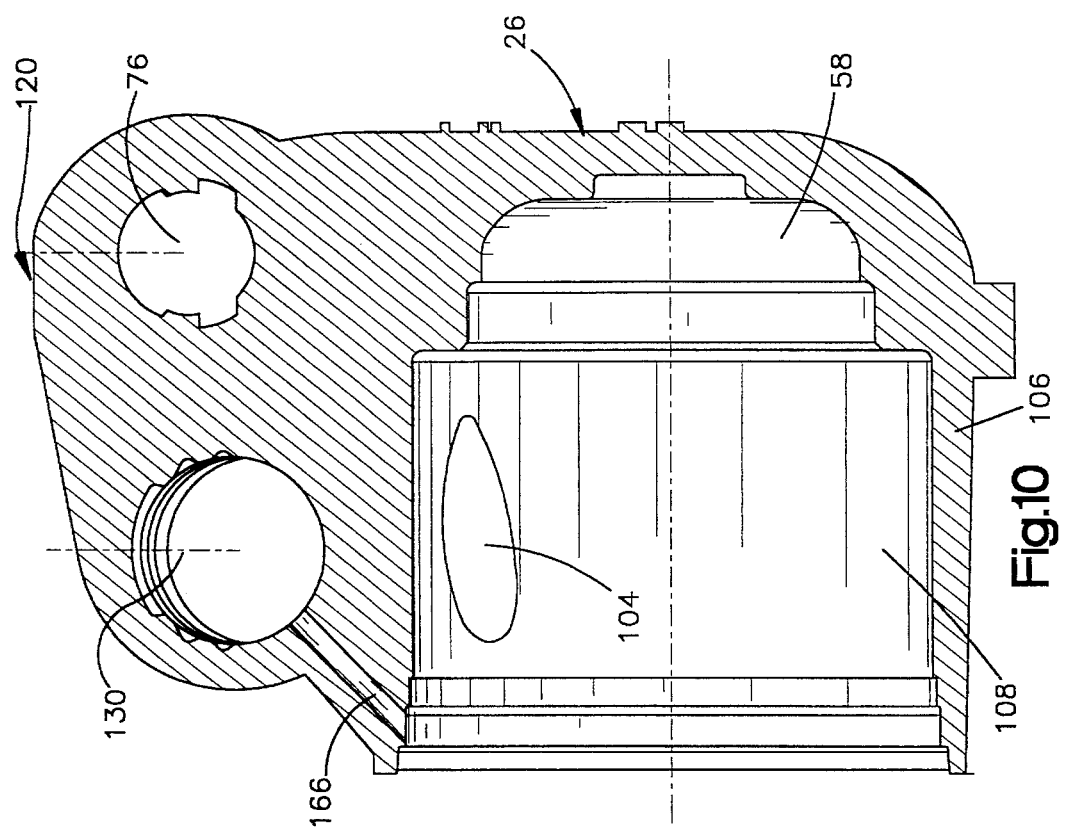
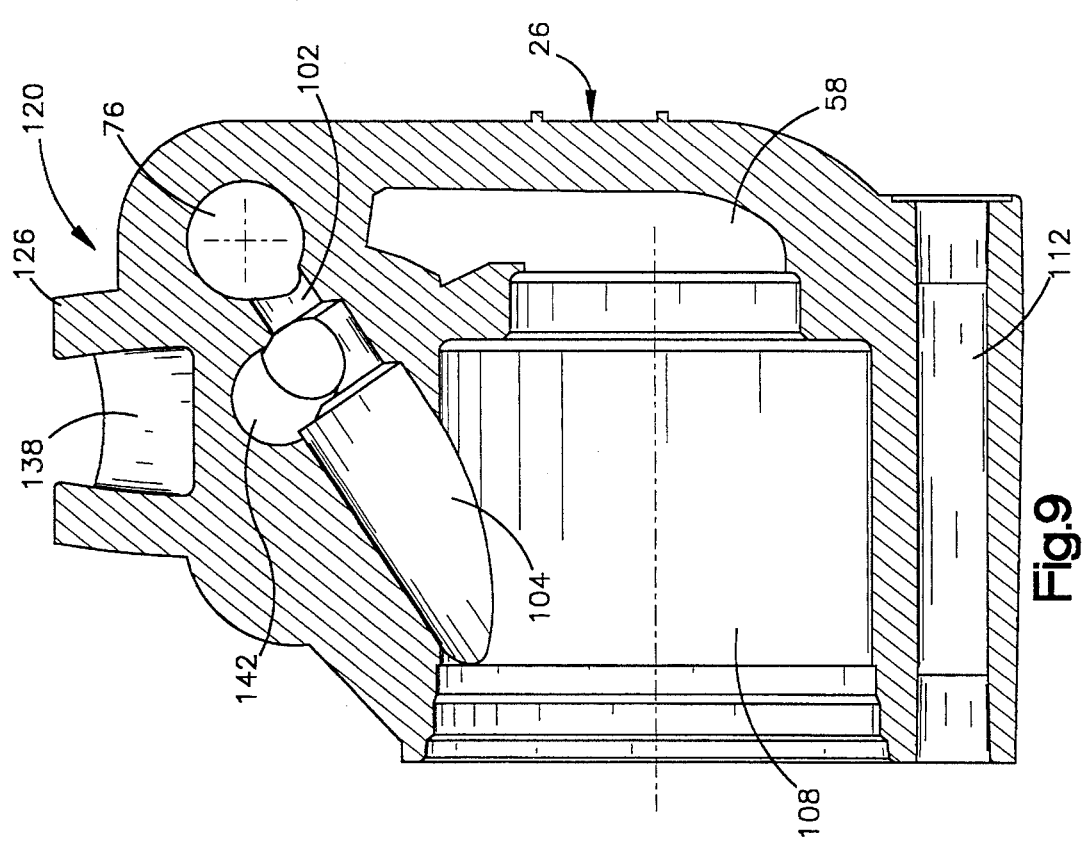

5,496,155

ROTARY DEVICE HAVING PLURAL MOUNTING ORIENTATIONS AND FLUID CONNECTIONS

BACKGROUND OF THE INVENTION

The present invention relates to a new and improved rotary device, such as a pump or motor, for use with fluid.

A pump or motor may be mounted in many different orientations on a support structure. For example, power steering pumps in different types of vehicles may be mounted in different orientations depending upon the available space within an engine compartment. In addition, conduits for conducting fluid to power steering pumps in different vehicles may be connected with different portions of the power steering pump.

Since power steering pumps may be mounted in different orientations in different vehicles, the manufacture of power steering pumps is simplified if the same components can be used for power steering pumps which are mounted in the different orientations. In addition, repair and maintenance of power steering pumps in different vehicles is simplified if the power steering pumps in the different vehicles have the same components.

SUMMARY OF THE INVENTION

The present invention provides a new and improved rotary device, such as a fluid pump or motor. The rotary device can be mounted in many different orientations on a support structure. In addition, a fluid conduit can be connected with a plurality of different portions of the rotary device to facilitate mounting of the rotary device in different orientations on a support structure.

The rotary device includes a housing having a main section and a cover section which enclose components of the rotary device. The main and cover sections are movable relative to each other to any one of a plurality of orientations to enable the rotary device to be mounted in different orientations on different support structures. A main section of the housing has a plurality of risers.

Each of the risers has a surface defining a location which may be connected with a fluid conduit. Depending upon the desired orientation of the fluid conduit relative to the main section of the housing, one of the plurality of connection locations is selected. At the selected connection location, the housing is machined to form a portion of a connection for the fluid conduit and to form passages in the housing. The other connection locations, which were not selected, are left intact.

During use of the rotary device, fluid tends to leak along a drive shaft to a seal. The fluid which leaks along the drive shaft to the seal is conducted away from the seal through a drain passage in the cover section of the housing and a drain passage in the main section of the housing. The seal drain passages in the cover section and main section of the housing are interconnected through an annular manifold chamber disposed between the cover and main sections of the housing. The annular manifold chamber enables the cover section and main section of the housing to be moved relative to each other to provide a selected orientation of the main section of the rotary device relative to the cover section.

BRIEF DESCRIPTION OF THE DRAWING

The foregoing and other features of the present invention will become apparent to one skilled in the art to which the present invention relates upon consideration of the following description of the invention with reference to the accompanying drawings, wherein:

FIG. 7 is a side elevational view, taken generally along the line 7—7 of FIG. 6;

FIG. 8 is a sectional view, taken generally along the line 8—8 of FIG. 6;

FIG. 9 is a sectional view, taken generally along the line 9—9 of FIG. 6;

FIG. 10 is a sectional view, taken generally along the line 10—10 of FIG. 6;

DESCRIPTION OF ONE SPECIFIC PREFERRED EMBODIMENT OF THE INVENTION

General Description

Figure 1:
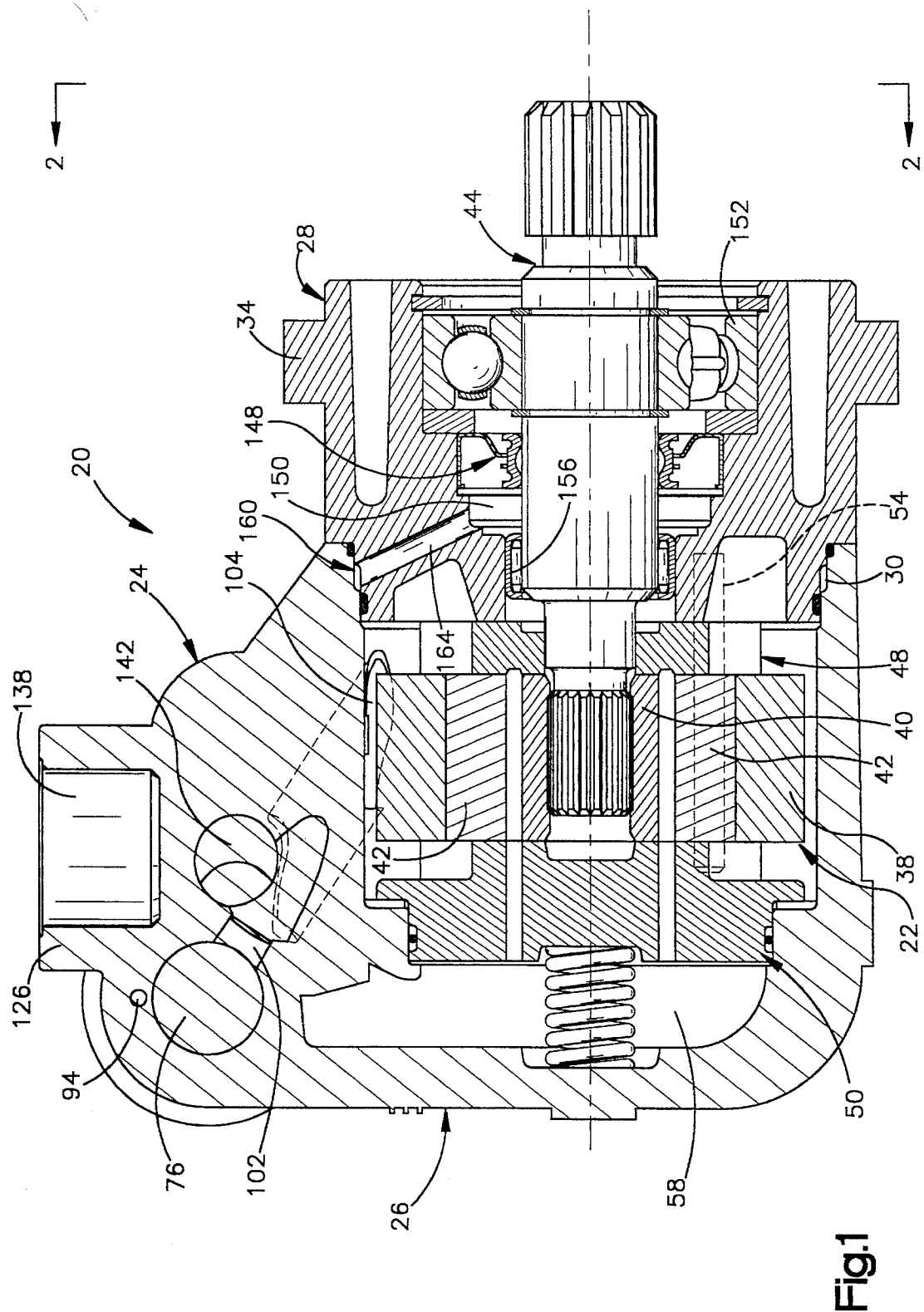
FIG. 1 is a sectional view of a rotary device constructed in accordance with the present invention.

A rotary device 20 (FIG. 1) is used with fluid. Although the rotary device 20 may be either a pump or a motor, in the illustrated embodiment of the invention, the rotary device 20 is a hydraulic pump suitable for use as a power steering pump in a vehicle. However, it should be understood that the rotary device 20 could be used as a hydraulic pump at other locations. It should also be understood that the rotary device 20 may be used as a hydraulic motor.

The pump 20 includes a working unit 22 which is enclosed by a housing 24. The housing 24 includes a main section 26 and a cover section 28. The cover section 28 telescopically engages the main section 26 at a joint 30.

Figure 3:
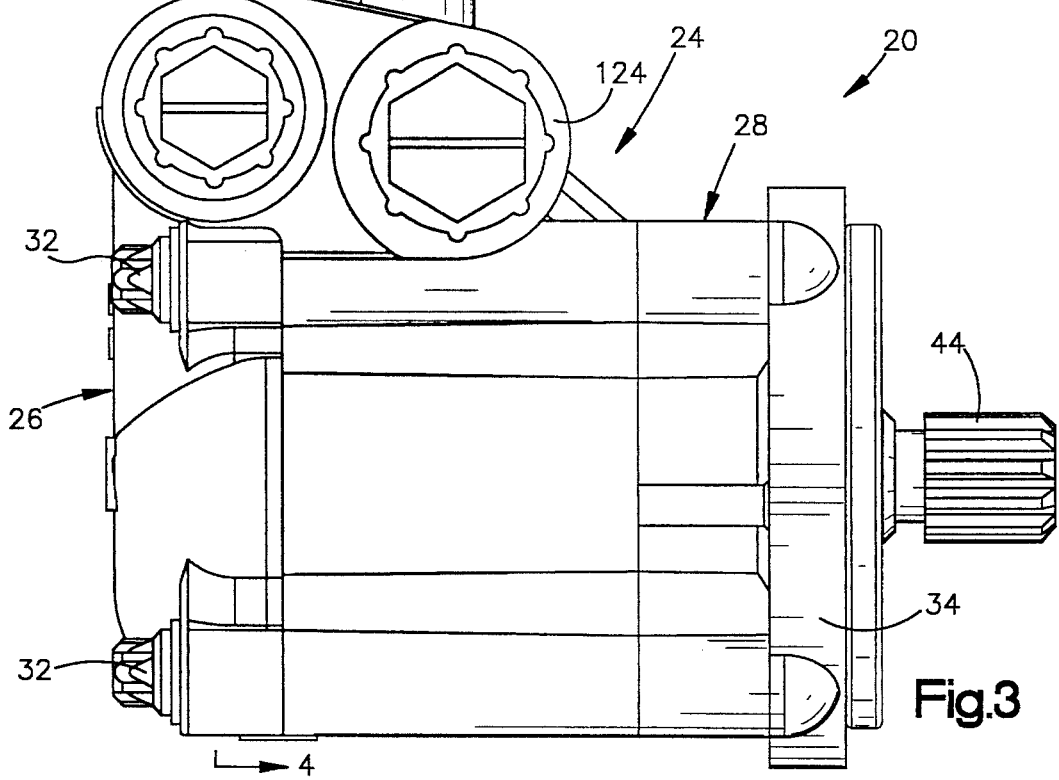
FIG. 3 is a side elevational view, taken generally along the line 3—3 of FIG. 2.

The main section 26 is a one-piece metal casting. Similarly, the cover section 28 is a one-piece metal casting. The main section 26 is connected to the cover section 28 by retainer bolts 32 (FIG. 3). Although only two retainer bolts 32 have been shown in FIG. 3, it should be understood that there are four, relatively long, retainer bolts which extend from the rear of the main section 26 of the housing 24 into threaded openings in the cover section 28 of the pump 20. A mounting flange 34 on the cover section 28 is used to connect the pump 20 with a suitable support structure.

The working unit 22 (FIG. 1) is enclosed by the housing 24. The working unit 22 includes a cylindrical cam ring 38 which extends around a rotor 40. A plurality of vanes 42 extend between the cam ring 38 and the rotor 40. A drive shaft 44 is connected with the rotor 40 and is rotatable to rotate the rotor and vanes 42 relative to the cam ring 38.

A bottom or wear end plate 48 is connected with the cover section 28 and engages the right (as viewed in FIG. 1) ends of the rotor 40 and cam ring 38. A top or pressure end plate 50 engages the axially opposite ends of the cam ring 38 and rotor 40. The cam ring 38, bottom or wear end plate 48, and top or pressure end plate 50 are connected to the cover section 28 by alignment pins 54.

Although only one alignment pin 54 is illustrated in FIG. 1, it should be understood that a pair of alignment pins engage the cam ring 38, bottom or wear end plate 48 and top or pressure end plate 50 to hold them against movement relative to the cover section 28. The cam ring 38, rotor 40, vanes 42, bottom or wear end plate 48, and top or pressure end plate 50 are connected with the cover section 28 by a pair of alignment pins in the same manner as is disclosed in co-pending U.S. patent application Ser. No. 08/194,410 filed Feb. 10, 1994, by Bruce C. Noah and entitled "Rotary Device and Method of Assembly", now U.S. Pat. No. 5,380,178.

Bypass Valve Assembly

Figure 2:
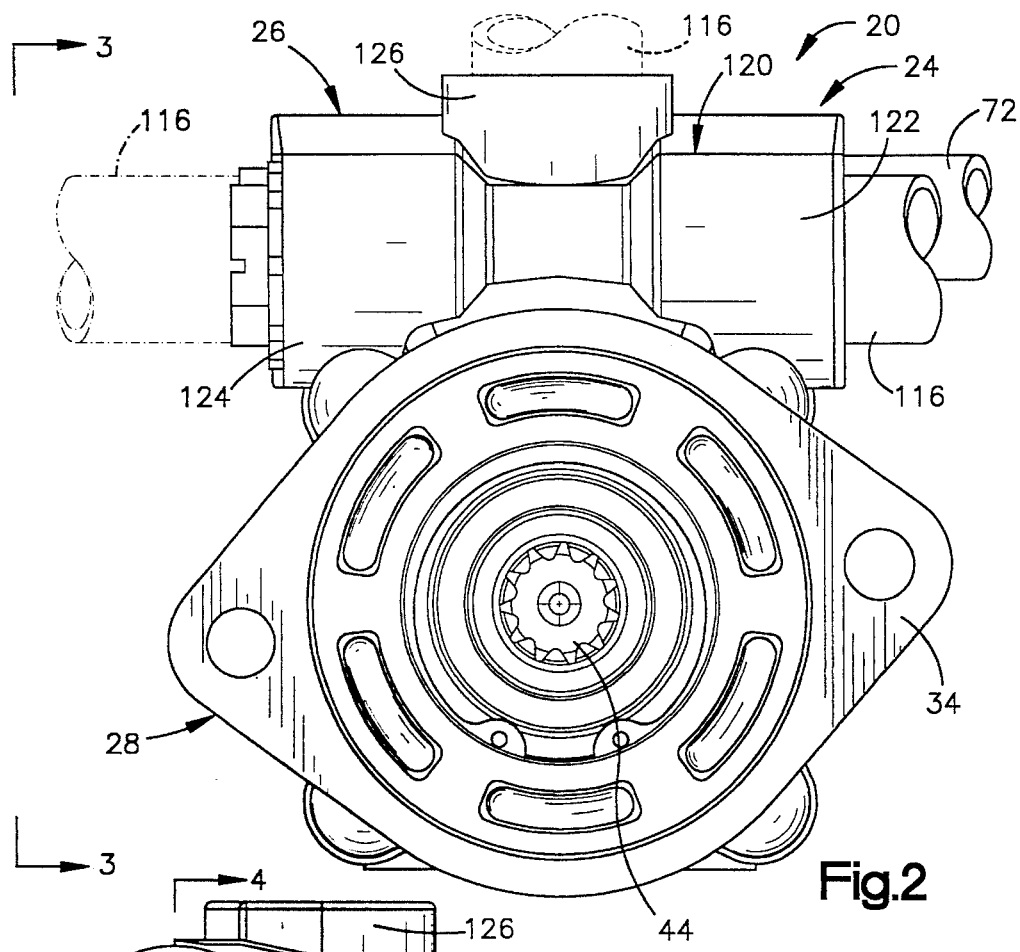
FIG. 2 is a front elevational view, taken generally along the line 2—2 of FIG. 1.
Figure 4:
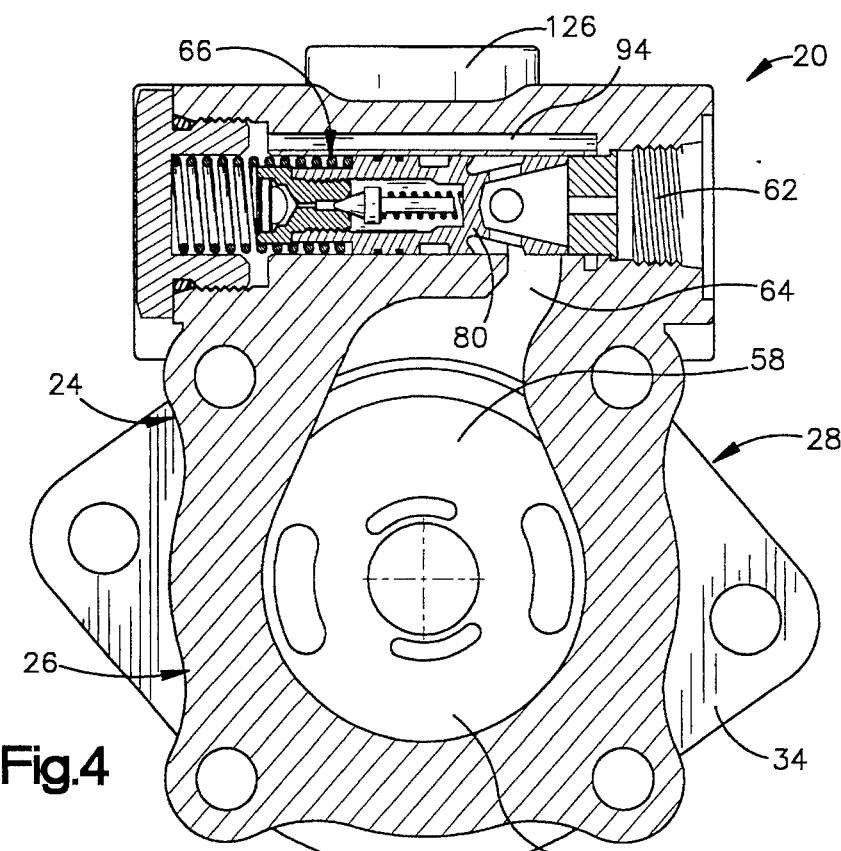
FIG. 4 is a sectional view, taken generally along the line 4—4 of FIG. 3.

During rotation of the drive shaft 44 and rotor 40 relative to the cam ring 38, the vanes 42 cooperate with the cam ring and the end plates 48 and 50 to form variable volume working chambers. Fluid is pumped from the variable volume working chambers to a discharge chamber 58 disposed between the top or pressure end plate 50 and the main section 26 of the housing 24. The discharge chamber 58 is connected with an outlet connection 62 (FIG. 4) through an outlet passage 64 and a bypass valve assembly 66. Relatively high pressure fluid is conducted away from the outlet connection 62 and the pump 20 through a discharge conduit 72 (FIG. 2).

Figure 5:
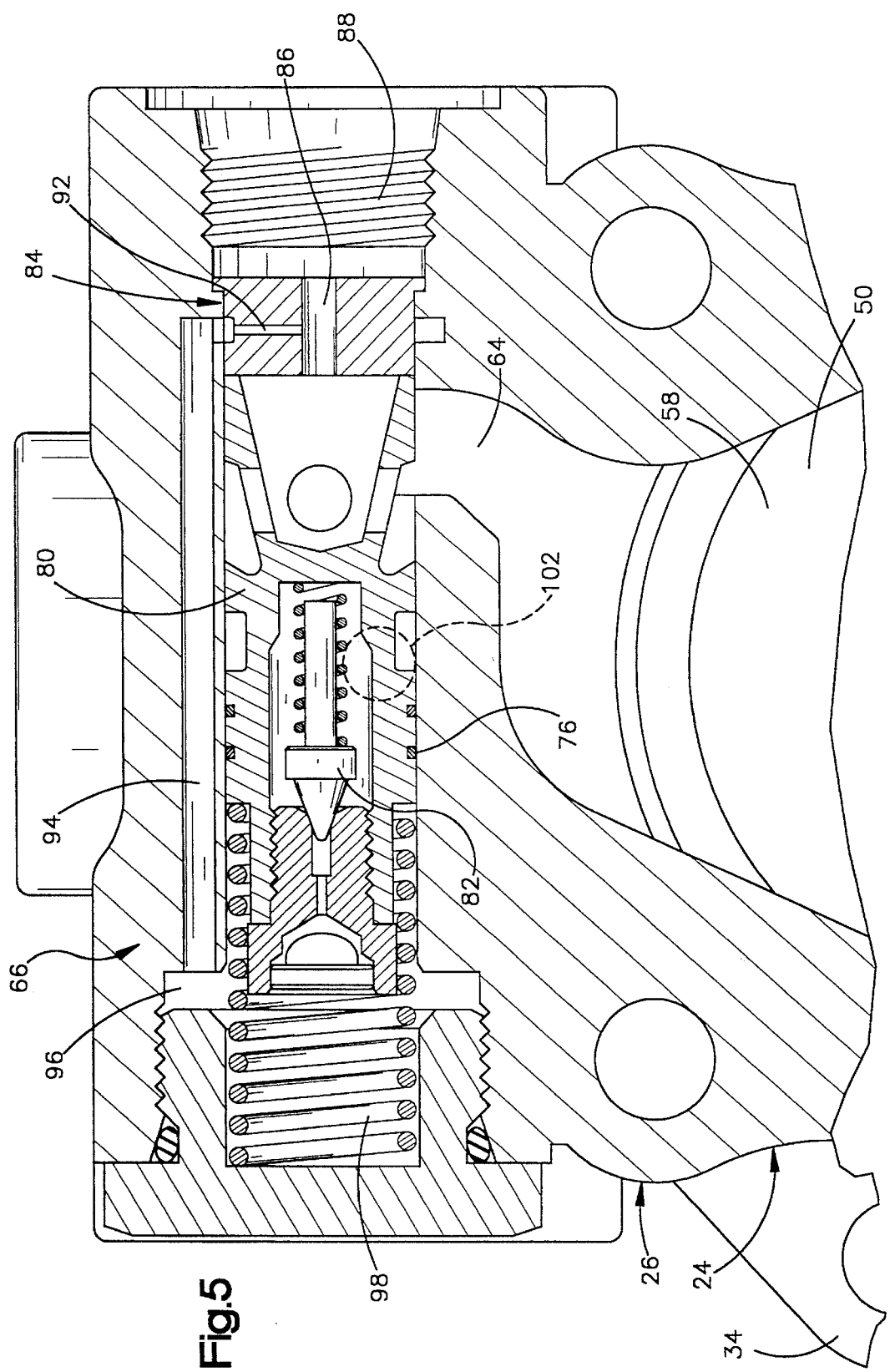
FIG. 5 is an enlarged view of a portion of FIG. 4.

The bypass valve assembly 66 (FIG. 5) is disposed in a generally cylindrical bypass valve chamber 76. The bypass valve assembly 66 includes a bypass valve member 80 which is axially movable in the bypass valve chamber 66. A pressure relief valve 82 is mounted on the bypass valve member 80. A stationary orifice plug 84 is provided in the main section 26 of the housing adjacent to the right (as viewed in FIG. 5) end of the bypass valve member 80. Fluid discharged from the working unit 22 (FIG. 1) is conducted through a cylindrical orifice 86 (FIG. 5) in the orifice plug 84 to the discharge conduit 72 (FIG. 2) which is connected with an internally threaded connector 88.

A radially extending passage 92 (FIG. 5) in the orifice plug 84 conducts fluid pressure from the orifice 86 to a passage 94 formed in the main section 26 of the housing 24. The passage 94 is connected in fluid communication with a pressure chamber 96 at the left (as viewed in FIG. 5) end of the bypass valve member 80. The fluid pressure in the pressure chamber 96 and a coil spring 98 urge the bypass valve member 80 toward the initial position shown in FIG. 5.

When the fluid pressure at the outlet passage 64 exceeds the combined influence of the fluid pressure in the chamber 96 and the coil spring 98, the bypass valve member 80 is moved toward the left (as viewed in FIG. 5) to connect the outlet passage 64 with a bypass passage 102. The fluid from the bypass passage 102 is conducted to an inlet passage 104 (FIG. 9). Thus, this relatively high pressure fluid bypassed from the outlet 64 to the bypass passage 102 is used to pressurize the inlet fluid.

Main Housing Section

Figure 6:
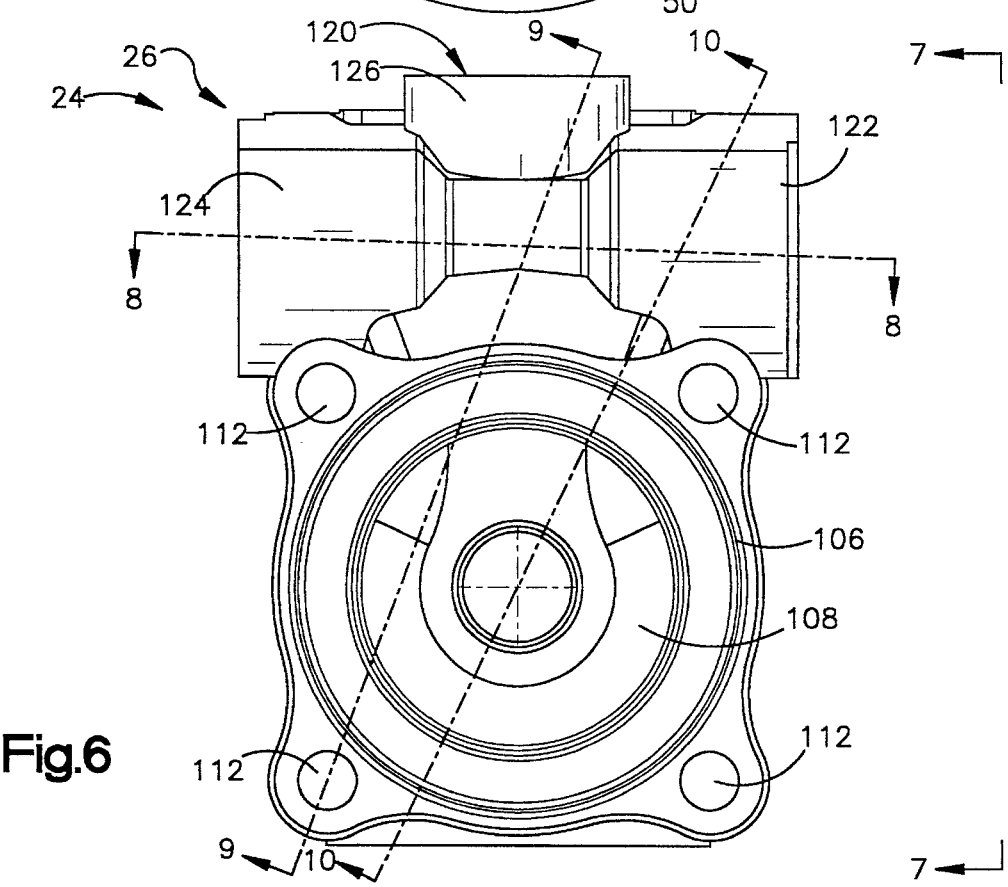
FIG. 6 is a front elevational view of a main section of a housing of the rotary device of FIG. 1.

The main section 26 (FIG. 6) of the housing 24 is a one-piece metal casting. The main section 26 has a generally cylindrical wall 106 (FIGS. 6 and 10) which forms a cylindrical working unit chamber 108 for the working unit 22 (FIG. 1). A plurality of retainer bolt holes 112 (FIG. 6) are formed in the main section 26. The retainer bolt holes 112 in the main section 26 are axially aligned with tapped holes in the cover section 28 (FIG. 3). The retainer bolts 32 extend through the holes 112 into threaded engagement with the holes in the cover section 28.

In accordance with one of the features of the present invention, the main section 26 of the housing 24 is constructed in such a manner as to enable an inlet or fluid supply conduit 116 (FIG. 2) to be connected with the main section 26 at a selected one of three different locations. Thus, the fluid supply conduit 116 may be connected with the right side of the main section 26, in the manner indicated in solid lines in FIG. 2. However, if desired, the main section 26 may be fabricated in such a manner as to enable the fluid supply conduit 116 to be connected with the left side of the main section, in the manner indicated in dash-dot lines in FIG. 2. Alternatively, the main section 26 may be fabricated so as to enable the fluid supply conduit 116 to be connected with a central portion of the main section, in the manner indicated schematically in dash lines in FIG. 2.

The main section 26 of the housing 24 has a riser section 120 which projects upward and sideward (FIGS. 6 and 7) from the wall 106. The riser section 120 includes three risers, that is a right riser 122, a left riser 124 and a center riser 126. Each of the risers 122, 124, and 126 has the potential of being fabricated to be connected with the fluid supply conduit 116.

During construction of the pump 20, one of the three risers 122, 124 and 126 is selected for connection with the fluid supply conduit 116 (FIG. 2). The selected riser 122, 124 or 126 is then drilled and tapped to form an inlet connector for use in connecting the fluid supply conduit 116 with the main section 26 of the pump 20. In the embodiment of the pump illustrated in FIGS. 1–11, the right riser 122 is drilled and tapped to form an inlet connector 130 (FIG. 8) for connection with the fluid supply conduit 116 (FIG. 2). The left riser 124 (FIG. 8) is left intact in its as-cast condition. Similarly, the center riser 126 (FIG. 1) is left intact in its as-cast condition.

In its original or as-cast condition, the left riser 124 has a cylindrical recess 134 (FIG. 8) which extends into the riser section 120. Similarly, in its original or as-cast condition, the center riser 126 (FIG. 1) has a cylindrical recess 138 which extends into the riser section 120. The right and left risers 122 and 124 have coincident central axes (FIG. 8) which extend parallel to a central axis of the bypass valve chamber 76. The center riser 126 has a central axis which extends perpendicular to the coincident central axes of the right and left risers 122 and 124. The central axis of the center riser 126 is offset to the left (as viewed in FIG. 3) of the coincident central axes of the right and left risers 122 and 124.

The capability of connecting the inlet or fluid supply conduit 116 with any one of the three risers 122, 124 or 126

(FIG. 2) enables the pump 20 to be used in many different situations. Thus, it is contemplated that in certain situations it will be desired to have the inlet or fluid supply conduit 116 connected with the right riser 122, in the manner shown in solid lines in FIG. 2. However, in other situations, it is contemplated that it will be desired to have the inlet conduit 116 connected with either the right riser 124 or the center riser 126, in the manner indicated schematically in dash-dot and dash lines in FIG. 2. Since the same main section 26 of the housing 24 can be used when the fluid supply conduit 116 is to be connected with either the right, left or center riser 122, 124 or 126, manufacture of the pump 20 is facilitated.

The right (as viewed in FIG. 8) riser 122 is connected with the main inlet passage 104 by an inlet connector passage 142 (FIG. 8). The inlet connector passage 142 is drilled in the riser section 120 of the main section 26 of the housing 24. The inlet connector passage 142 extends from the inlet connector 130 to the main inlet passage 104. This results in the main inlet passage 104 being connected in fluid communication with the bypass valve chamber 76 by the bypass passage 102 and with the inlet connector 130 by the inlet connector passage 142.

Seal Drain System

A seal assembly 148 (FIGS. 1 and 11) is provided to block leakage of fluid along the drive shaft 44 during operation of the pump 20. The seal assembly 148 is disposed in an annular seal chamber 150. The seal chamber 150 is located between an annular outer or main bearing assembly 152 and an annular inner bearing assembly 156. The annular seal assembly 148 engages the cover section 28 and drive shaft 44 to block flow of fluid from the working unit 22 along the drive shaft 44 to the outer bearing assembly 152. During operation of the pump 20, fluid which leaks along the drive shaft 44 will accumulate in the portion of the seal chamber 150 disposed between the seal assembly 148 and the inner bearing assembly 156.

Figure 11:
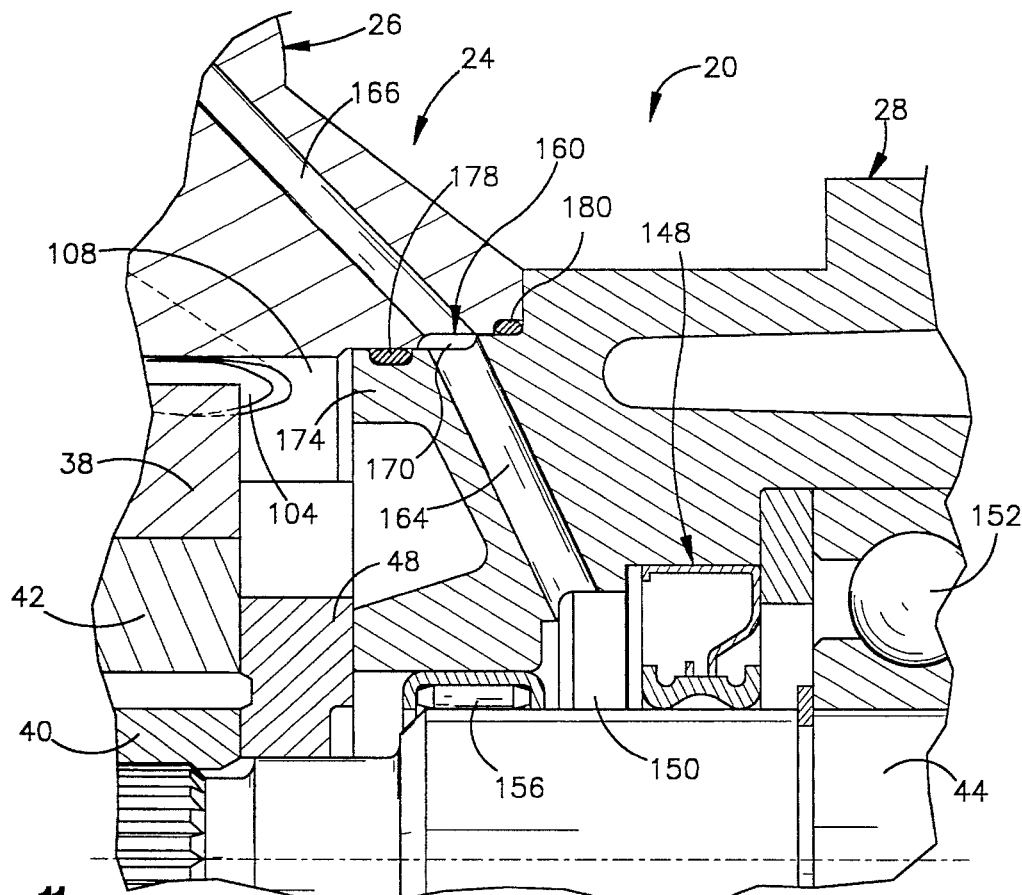
FIG. 11 is an enlarged schematicized sectional view illustrating the relationship of seal drain passages to a seal.

In accordance with a feature of the present invention, a seal drain passage system 160 is provided to conduct fluid from the seal chamber 150 to the inlet for the pump 20. The seal drain passage system 160 includes a passage 164 formed in the cover section 28 (FIGS. 1 and 11). The seal drain passage system 160 also includes a passage 166 (FIGS. 10 and 11) formed in the main section 26 of the housing 24. The passage 166 extends from an annular manifold passage 170 (FIG. 11) to the inlet connector 130 (FIG. 8).

During construction of the pump 20, the inlet connector 130 in the right riser 122 was selected for connection with the fluid supply conduit 116 (FIG. 2). Therefore, the as-cast recess in the right riser 122 is drilled and tapped to form the inlet connector 130 (FIG. 8). The inlet connector passage 142 is drilled in the riser section 120 to connect the inlet connector 130 in fluid communication with the main inlet passage 104. The passage 166 (FIG. 10) is drilled between the inlet connector 130 and the annular manifold passage 170 (FIG. 11).

The seal drain passage 166 in the main section 26 has been schematically illustrated in FIG. 11 as being in the same plane as the seal drain passage 164 in the cover section 28. However, the seal drain passage 166 in the main section 26 is actually offset to the right (as viewed in FIG. 8) of the cover section drain passage 164 (FIG. 11). This is because the seal drain passage 166 (FIG. 10) extends between the inlet connector 130 in the right riser 122 (FIG. 8) and the annular manifold passage 170 (FIG. 11).

The annular manifold passage 170 (FIG. 11) is formed between the cover section 28 and the main section 26 of the housing 24. Thus, a cylindrical portion 174 of the cover section 28 is telescopically received in a cylindrical opening to the pump unit chamber 108 (FIG. 11) in the main section 26 of the housing 24. The annular manifold passage 170 is formed between the cylindrical portion 174 of the cover section 28 and the main section 26 of the housing 24. Suitable annular seal rings 178 and 180 are provided between the cylindrical end portion 174 of the cover section 28 and the main section 26 of the housing 24 to block fluid flow from the annular manifold passage 170.

During operation of the pump 20, fluid leaks along the drive shaft 44 through the inner bearing assembly 156 to the seal chamber 150. The seal assembly 148 blocks further leakage of the fluid along the drive shaft 44. The build up of excessive fluid pressure in the seal chamber 150 is prevented by the conducting of fluid from the seal chamber 150 through the seal drain passage 164 to the annular manifold passage 170.

Fluid is conducted from the annular manifold passage 170 to the seal drain passage 166 in the main section 26 of the housing 24. The seal drain passage 166 is connected in fluid communication with the inlet connector 130 (FIG. 10). Therefore, a flow of fluid from the seal chamber 150 through the seal drain passage system 160 is combined with the inlet fluid conducted through the inlet or fluid supply conduit 116 to the inlet connector 130.

Alternative Embodiments

In the embodiment of the invention illustrated in FIGS. 1–11, the inlet or fluid supply conduit 116 is connected with the right riser 122 (FIG. 2) on the main section 26 of the housing 24. In the embodiment of the invention illustrated in FIG. 12, the fluid inlet or supply conduit 116 is connected with the left riser 124, in the manner indicated schematically in dash-dot lines in FIG. 2. Since the embodiment of the invention illustrated in FIG. 12 is generally similar to the embodiment of the invention illustrated in FIGS. 1–11, similar numerals will be utilized to designate similar components, the suffix letter "a" being associated with the numerals of FIG. 12 in order to avoid confusion.

Figure 12:
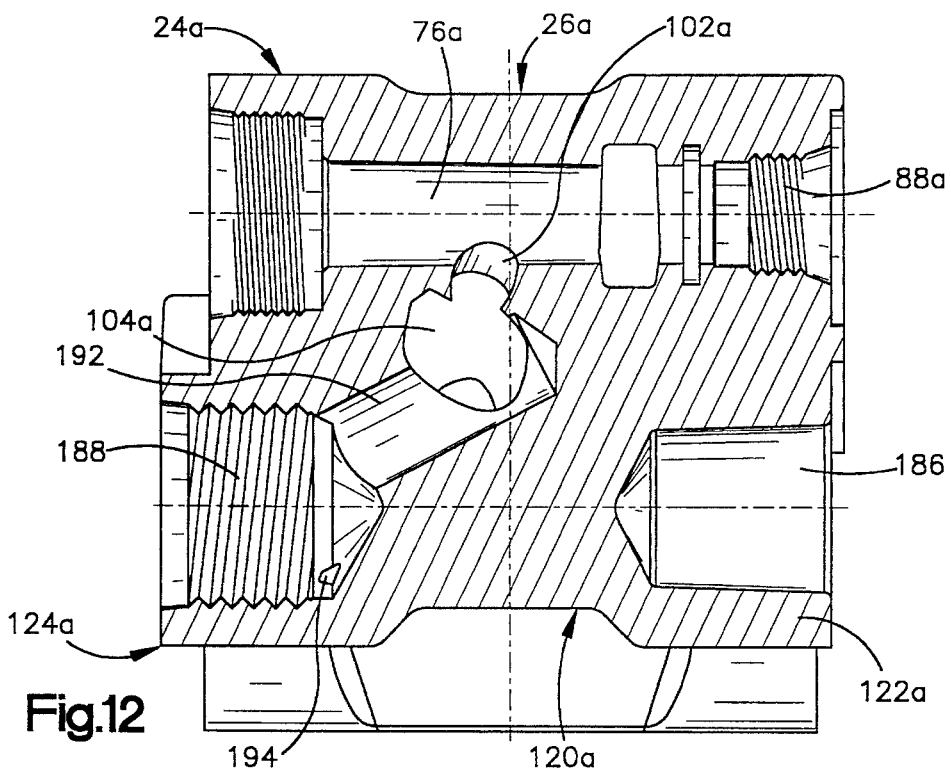
FIG. 12 is sectional view, generally similar to FIG. 8, of a second embodiment of the rotary device.

In the embodiment of the invention illustrated in FIG. 12, the fluid supply or inlet conduit 116 (FIG. 2) is to be connected with the left riser 124a (FIG. 12). Therefore, a recess 186 in the right riser 122a remains in an as-cast condition while a recess in the left riser 124a is drilled and tapped to form an inlet connector 188 having the same construction as the inlet connector 130 (FIG. 8). The inlet or supply conduit 116 (FIG. 2) is connected with the inlet connector 188 (FIG. 12).

An inlet connector passage 192 is drilled in the main section 26a to connect the inlet connector 188 in fluid communication with the main inlet passage 104a. The main inlet passage 104a is also connected in fluid communication with the bypass valve chamber 76a by a bypass passage 102a.

A seal drain passage 194 (FIG. 12) is drilled between the inlet connector 130 and an annular manifold passage formed between the main section 26a of the housing 24a and a cover section (not shown) of the housing 24a. The seal drain passage 194 extends to the manifold passage in the same manner as in which the seal drain passage 166 extends to the annular manifold passage 170 (FIG. 11).

In the embodiment of the invention illustrated in FIGS. 1–11, the inlet conduit 116 is connected with the right riser 122 (FIG. 2). In the embodiment of the invention illustrated in FIG. 12, the inlet conduit is connected with the left riser 124a. In the embodiment of the invention illustrated in FIG.

13, the inlet conduit 116 is connected with the center riser 126, in the manner illustrated in dash-dot-dot lines in FIG. 2. Since the embodiment of the invention illustrated in FIG. 13 is generally similar to the embodiment of the invention illustrated in FIGS. 1–11, similar numerals will be utilized to designate similar components, the suffix letter "b" being associated with the numerals of FIG. 13 to avoid confusion.

Figure 13:
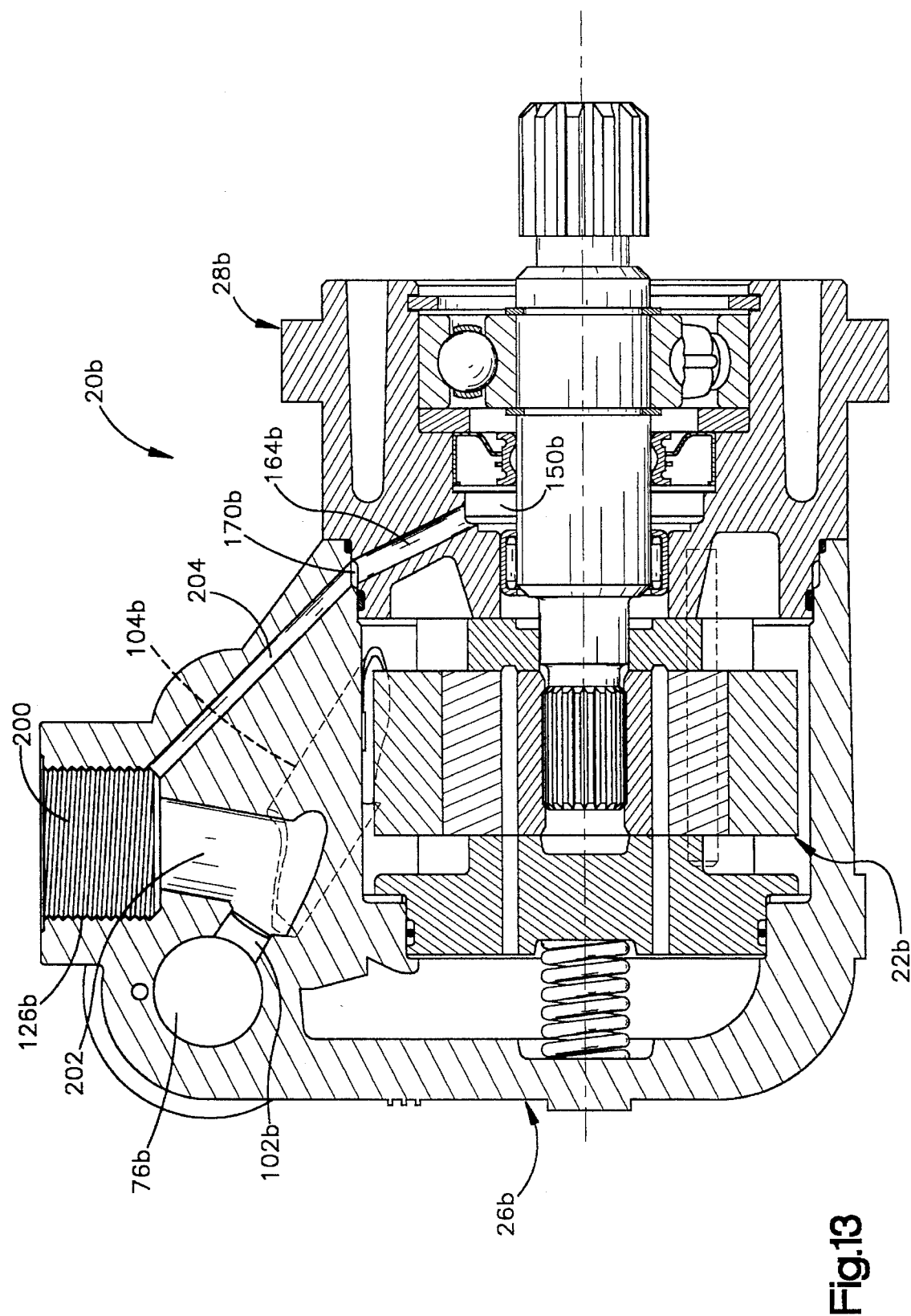
FIG. 13 is a sectional view, generally similar to FIG. 1, of a third embodiment of the rotary device.

In the embodiment of the invention illustrated in FIG. 13, the center riser 126b is drilled and tapped to form an inlet connector 200. An inlet connector passage 202 is drilled to connect the inlet connector 200 in fluid communication with the main inlet passage 104b. The bypass passage 102b connects the bypass chamber 76b in fluid communication with the main inlet passage 104b.

A seal drain passage 204 is drilled from the inlet connector 204 to an annular manifold passage 170b. The annular manifold passage 170b connects the seal drain passage 204 in fluid communication with the seal drain passage 164b and the seal chamber 150b.

Main and Cover Section Orientation

It is contemplated that the pump 20 will be used in many different environments. Thus, the pump 20 may be utilized as a power steering fluid supply pump for a power steering system in a vehicle. Different amounts of space are available in the engine compartment of different vehicles. In order to enable the pump 20 to be used with many different vehicles, the orientation of the main section and cover section can be changed relative to each other.

Figure 14:
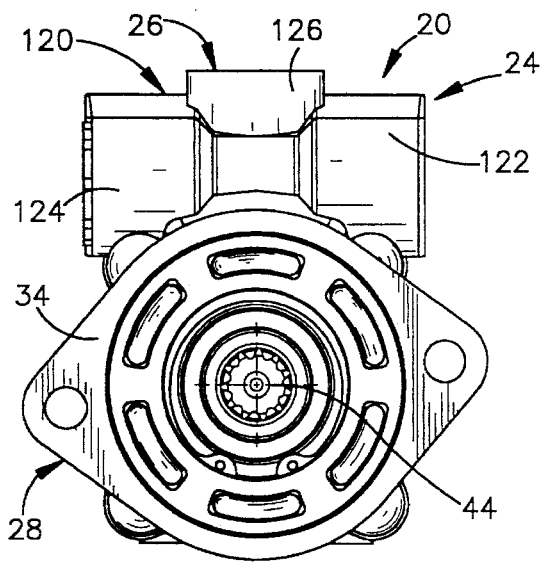
FIG. 14 is a front elevational view, generally similar to FIG. 2, illustrating a first orientation of the main section of the housing relative to a cover section.
Figure 15:
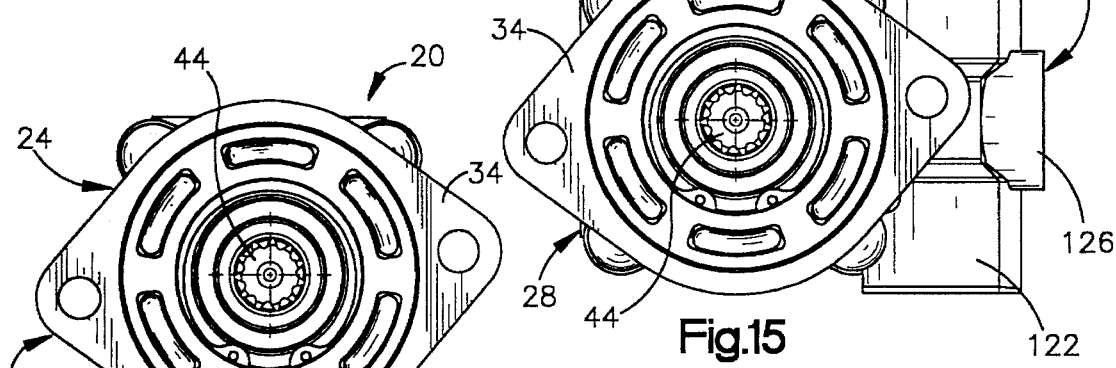
FIG. 15 is a front elevational view, generally similar to FIG. 14, illustrating a second orientation of the main section of the housing relative to the cover section.

The pump 20 may be mounted with the riser section 120 on the main section 26 of the housing 24 extending upwardly in the manner illustrated in FIGS. 2 and 14. However, if desired, the orientation of the main section 26 of the housing 24 may be changed by 90° increments relative to the cover section 28. Thus, the main section 26 of the housing may be rotated through 90° in a clockwise direction from the position shown in FIG. 14 to the position shown in FIG. 15.

When the orientation of the main section 26 of the pump 20 is to be changed relative to the orientation of the cover section 28, the retainer bolts 32 (FIG. 3) are loosened and the cover section 26 is rotated about the central axis of the drive shaft 44. The working unit 22 is fixedly secured with the cover section 28 by the alignment pins 54 (FIG. 1). Therefore, when the retainer bolts 32 have been withdrawn from the cover section 28, the main section 26 of the housing 24 is rotated relative to the working unit 22 and cover section 28 in a clockwise direction from the position shown in FIG. 14 to the position shown in FIG. 15. The retainer bolts 32 are then connected to the cover section 28. The annular seal drain manifold passage 170 (FIG. 11) in the seal drain passage system 160 enables the seal drain passage 166 in the main section 26 to be connected in fluid communication with the seal drain passage 164 in the cover section 28 when the main section is in either the orientation shown in FIG. 14 or the orientation shown in FIG. 15 relative to the cover section 28.

Figure 16:
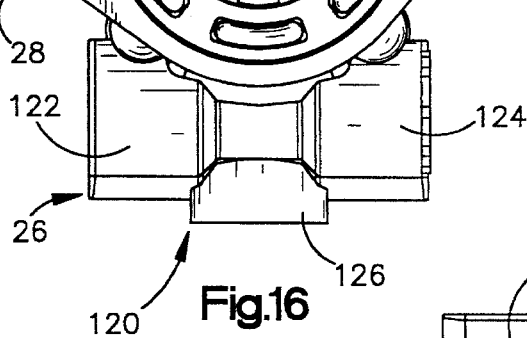
FIG. 16 is a front elevational view, generally similar to FIG. 15, illustrating a third orientation of the main section of the housing relative to the cover section.

The main section 26 of the housing 24 may be pivoted through 180° relative to the cover section from the position shown in FIG. 14 to the position shown in FIG. 16. During this movement of the main section 26 relative to the cover section, the alignment pins 54 hold the working unit 22 against rotation with the main section of the housing 24.

Figure 17:
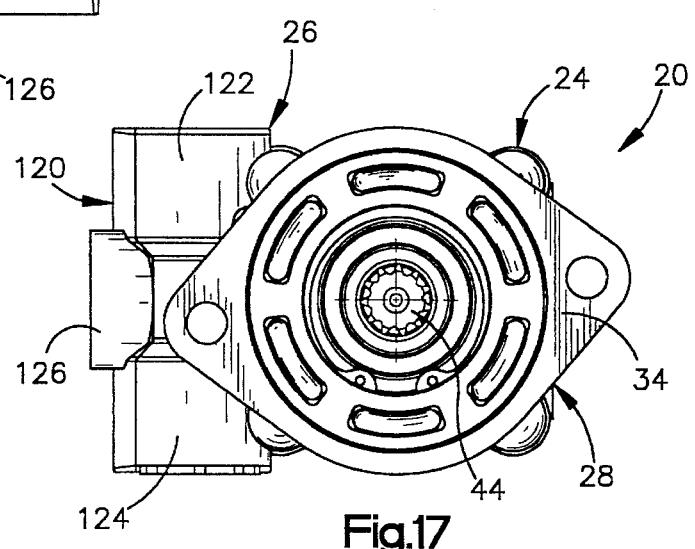
FIG. 17 is a front elevational view, generally similar to FIG. 16, illustrating a fourth orientation of the main section of the housing relative to the cover section.

The main section 26 of the housing 24 may also be pivoted in a counterclockwise direction from the position shown in FIG. 14 to the position shown in FIG. 17. Thus, the main section 26 and cover section 28 may have an orientation relative to each other which corresponds to any one of the orientations illustrated in FIGS. 14, 15, 16 and 17.

In each of the foregoing main section orientations (FIGS. 14, 15, 16 and 17), the annular manifold passage 170 connects the seal chamber 150 and seal drain passage 164 in the cover section 28 in fluid communication with a seal drain passage in the main section 26. Regardless of which of the four positions illustrated in FIGS. 14–17 is selected for the main section 26 of the housing 24, the orientation of the working unit 22 relative to the cover section 28 remains constant since the alignment pins 54 hold the cam ring 38, bottom or wear end plate 48 and top or pressure end plate 50 against rotation relative to the cover section 28. The fluid supply conduit 116 may be connected with any one of the risers 122, 124 or 126 in each of the main section orientations of FIGS. 14, 15, 16 and 17.

From the above description of the invention, those skilled in the art will perceive improvements, changes and modifications. Such improvements, changes and modifications within the skill of the art are intended to be covered by the appended claims.

Having described the invention, the following is claimed:

1. A rotary device for use with fluid, said rotary device comprising:

means for pumping fluid, said means for pumping fluid including a drive shaft;

housing means for enclosing said means for pumping fluid, said housing means including a main section and a cover section, said main section and said cover section of said housing means being movable relative to each other to any one of a plurality of orientations, said main section of said housing means at least partially defining a chamber in which said means for pumping fluid is disposed, said main section of said housing means defining a fluid inlet passage through which fluid is conducted to the chamber in said main section of said housing means to supply fluid to said means for pumping fluid, said cover section of said housing means being effective to at least partially block one end of said chamber in said main section of said housing means;

seal means connected with said cover section and engaging said drive shaft to block leakage of fluid along said drive shaft;

a manifold chamber disposed between said cover section and said main section of said housing means;

first passage means disposed in said cover section of said housing means and extending between said manifold chamber and a location disposed between said means for pumping fluid and said seal means; and second passage means disposed in said main section of said housing means for conducting fluid away from said manifold chamber directly to said inlet passage, said second passage means being spaced from said chamber in said main section of said housing means to enable fluid to be conducted through said second passage means to said inlet passage without passing through said chamber in said main section of said housing means, said first and second passage means being movable relative to each other during movement of said main section and said cover section of said housing means relative to each other.

2. A rotary device as set forth in claim 1 further including first and second bearing means disposed in said cover section for supporting said drive shaft, said first bearing means being disposed between said second bearing means and said means for pumping fluid, said seal means being disposed in engagement with a portion of said drive shaft located between said first and second bearing means, said first passage means being connected in fluid communication with an annular chamber which extends around said drive shaft at a location between said first and second bearing means.

3. A rotary device as set forth in claim 1 further including means for connecting said means for pumping fluid with said cover section of said housing means for movement therewith relative to said main section of said housing means.

4. A rotary device as set forth in claim 1 further including bearing means for supporting said drive shaft for rotation relative to said housing means, said seal means being disposed in engagement with a portion of said drive shaft disposed between said means for pumping fluid and said bearing means, said first passage means being connected in fluid communication with an annular space which extends around said drive shaft at a location between said seal means and said means for pumping fluid.

5. A rotary device for use with fluid, said rotary device comprising:

a rotor;

a plurality of vanes connected with said rotor;

a cam ring extending around said rotor;

a first end plate disposed adjacent to a first end of said rotor;

a second end plate disposed adjacent to a second end of said rotor, said first and second plates, cam ring, rotor and vanes cooperating to form a plurality of variable volume working chambers;

housing means for enclosing said rotor, vanes, cam ring and first and second end plates, said housing means including a main section and a cover section which are disposed in a telescopic relationship;

one of said sections of said housing means including mounting means for use in mounting said rotary device on a support structure, said main section and cover section of said housing means being rotatable relative to each other to any one of a plurality of orientations to enable said mounting means to be used to mount said rotary device on the support structure with said main section and cover section of said housing means in any one of the plurality of orientations relative to each other;

fastener means for interconnecting said main section and cover section of said housing means when said main section and cover section are in any one of the plurality of orientations relative to each other;

a drive shaft connected with said rotor and extending through said cover section;

seal means connected with said cover section and engaging said drive shaft to block leakage of fluid along said drive shaft;

an arcuate manifold chamber formed between said cover section and said main section of said housing at a location where said cover section and said main section of said housing are disposed in a telescopic relationship, said arcuate manifold chamber having an extent along a central axis of said drive shaft which is less than the extent of the telescopic relationship between said cover section and said main section of said housing along the central axis of said drive shaft;

first passage means disposed in said cover section for conducting fluid away from said seal means to said arcuate manifold; and second passage means disposed in said main section of said housing means for conducting fluid away from said arcuate manifold chamber, said first and second passage means being rotatable relative to each other during rotation of said main section and said cover section of said housing means relative to each other.

6. A rotary device as set forth in claim 5 further including first and second bearing means disposed in said cover section for supporting said drive shaft, said first bearing means being disposed between said second bearing means and said rotor, said seal means being disposed in engagement with a portion of said drive shaft located between said first and second bearing means, said first passage means being connected in fluid communication with said arcuate manifold chamber at a location between said first and second bearing means.

7. A rotary device as set forth in claim 5 wherein said main section of said housing means includes a main passage for conducting fluid flow, said main section of said housing means including first surface means for at least partially defining a connection at a first location to conduct fluid flow between said main passage and a conduit and second surface means for defining a second location where said connection could be formed to enable fluid to be conducted between said main passage and a conduit connected with said main section of said housing means at the second location.

8. A rotary device as set forth in claim 6 further including third surface means for defining a third location where said connection could be formed to enable fluid to be conducted between said main passage and a conduit connected with said main section of said housing means at the second location.

9. A rotary device as set forth in claim 5 wherein said main section of said housing means is cast as one-piece having first surface means for defining a first location adjacent to a first side of said rotary device and second surface means for defining a second location adjacent to a second side of said rotary device, and means for forming a connection between a passage within said main section of said housing means and a conduit at one of said locations.

10. A rotary device as set forth in claim 5 wherein said main section of said housing means being formed as one-piece and has a first riser facing in a first direction, a second riser facing in a second direction opposite to said first direction and a third riser facing in a third direction which is transverse to said first and second directions, each of said first, second, and third risers including means for use in connecting said main section of said housing means with a first fluid conduit.

11. A rotary device as set forth in claim 10 wherein said first riser includes means for use in connecting said main section of said housing means with a second fluid conduit, one of said first and second fluid conduits conducting fluid flow to said main section of said housing means during operation of said rotary device and one of said fluid conduits conducting fluid flow from said rotary device during operation of said rotary device.

12. A rotary device for use with fluid, said rotary device comprising:

a rotor;

a plurality of vanes connected with said rotor;

a cam ring extending around said rotor;

a first end plate disposed adjacent to a first end of said rotor;

a second end plate disposed adjacent to a second end of said rotor, said first and second end plates, cam ring rotor and vanes cooperating to form a plurality of variable volume working chambers; and housing means for enclosing said rotor, vanes, cam ring and first and second end plates, said housing means including a main section and a cover section;

said main section of said housing means being cast as one-piece and having a plurality of risers, said plurality of risers include a first riser facing in a first direction, a second riser facing in a second direction which is opposite to said first direction, and a third riser in a facing a third direction which is transverse to said first and second directions;

each of said risers of said plurality of risers including surface means for defining a recess, said surface means defining a recess in one of said risers of said plurality of risers being machined to facilitate connecting said main section of said housing with a first fluid conduit, said surface means defining recesses in risers other than said one riser of said plurality of risers being in an as cast condition and blocking fluid flow through said risers other than said one riser of said plurality of risers.

13. A rotary device as set forth in claim 12 wherein one of said sections of said housing means includes mounting means for use in mounting said rotary device on a support structure, said main section and said cover section of said housing means being movable relative to each other to any one of a plurality of orientations to enable said mounting means to be used to mount said rotary device on the support structure with said main section and said cover section of said housing means in any one of a plurality of orientations relative to each other.

14. A rotary device as set forth in claim 12 further including a drive shaft connected with said rotor and extending through said cover section, bearing means disposed in said cover section for supporting said drive shaft for rotation relative to said cover, seal means connected with said cover section and engaging said drive shaft at a location between said bearing means and said rotor, and passage means for conducting fluid to one of said risers from a side of said seal means which faces toward said rotor.

15. A rotary device as set forth in claim 12 wherein said first and second risers are disposed in a portion of said main section which is disposed radially outwardly of said rotor.

16. A rotary device as set forth in claim 12 further including bypass valve means disposed in a cavity which is formed in said main section of said housing means for bypassing excess fluid flow, said cavity in which said bypass valve means is disposed extends between said first and second risers and has a central axis which extends parallel to said first and second directions.

* * * * *

UNITED STATES PATENT AND TRADEMARK OFFICE
CERTIFICATE OF CORRECTION

PATENT NO. : 5,496,155
DATED      : March 5, 1996
INVENTOR(S): Bruce C. Noah, Robert S. Phillips and
             Frederick D. Venable It is certified that error appears in the above-indentified patent and that said Letters Patent is hereby corrected as shown below:

Column 11, line 10, after "riser" delete --in a--.

Column 11, line 11, after "facing" insert --in--.

Signed and Sealed this

Eighth Day of October, 1996

Attest:

BRUCE LEHMAN

*Attesting Officer*  Commissioner of Patents and Trademarks